Patented June 19, 1923.

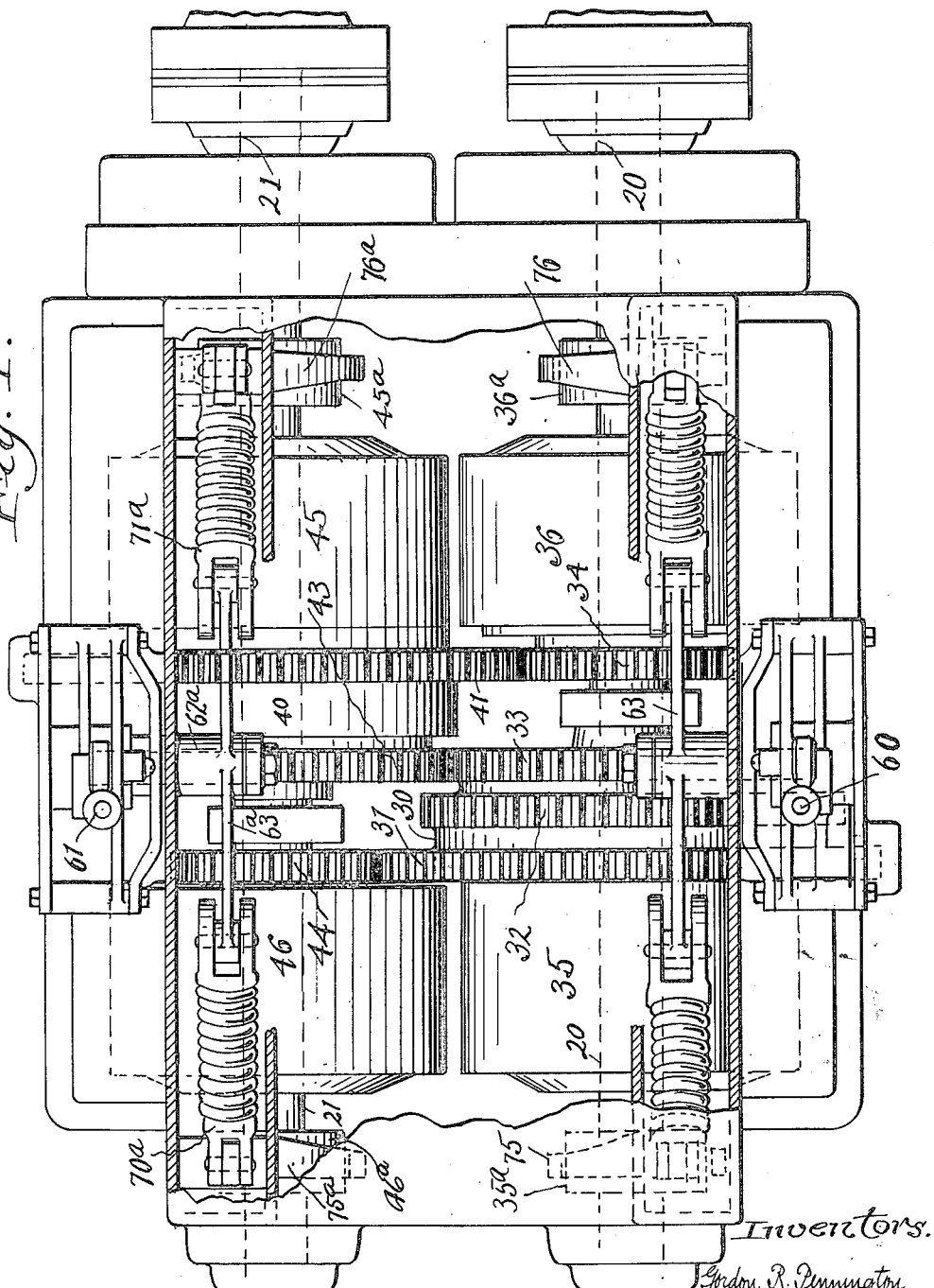

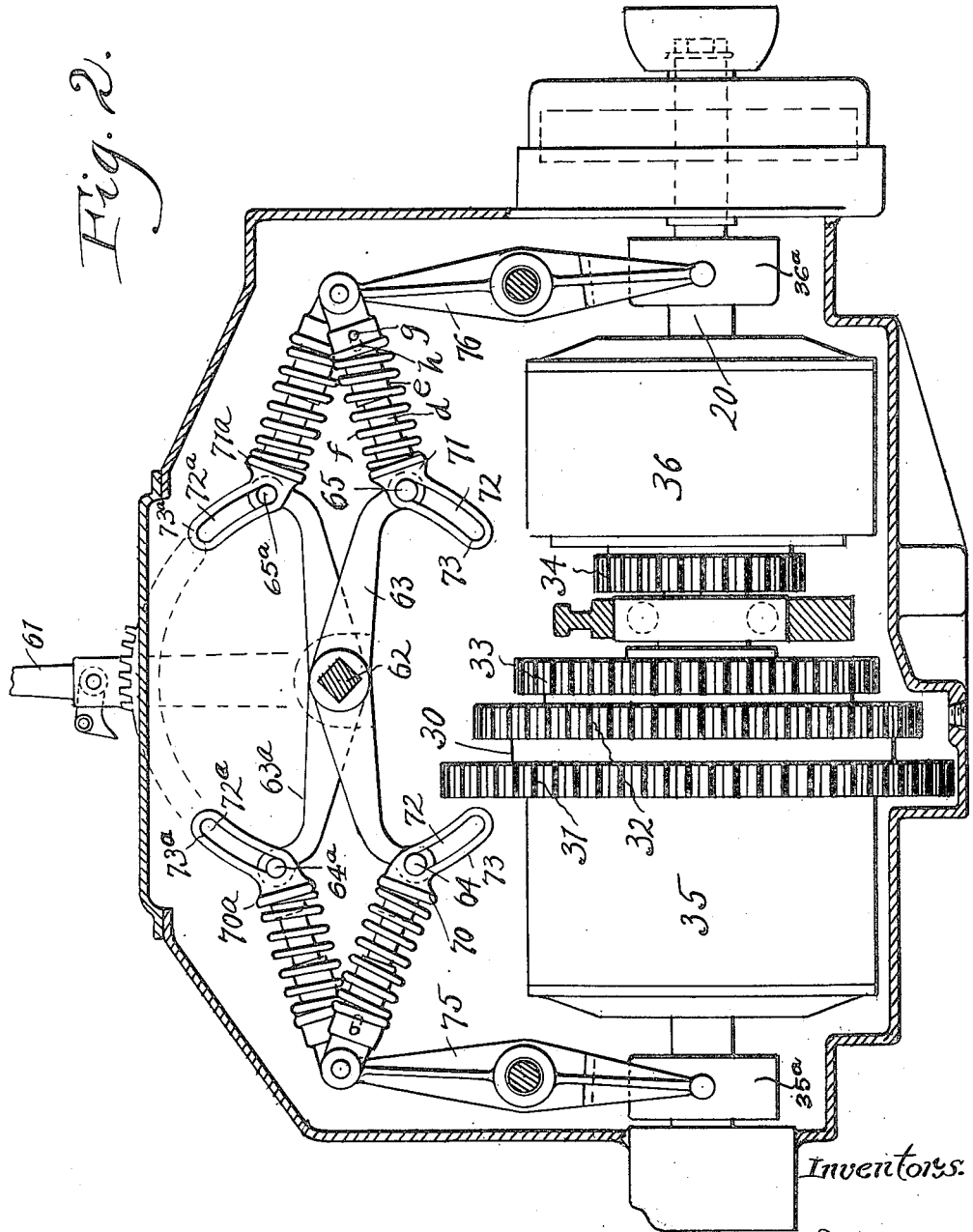

1,459,185

UNITED STATES PATENT OFFICE.

GORDON R. PENNINGTON, OF CLEVELAND, AND SAMUEL K. WELLMAN, OF CLEVELAND HEIGHTS, OHIO.

SLIDE-OPERATING MECHANISM.

Application filed December 5, 1919. Serial No. 342,626.

*To all whom it may concern:*

Be it known that we, GORDON R. PENNINGTON and SAMUEL K. WELLMAN, citizens of the United States, and residents, respectively, of Cleveland, in the county of Cuyahoga and State of Ohio, and Cleveland Heights, in the county of Cuyahoga and State of Ohio, have invented a certain new and useful Improvement in Slide-Operating Mechanism, of which the following is a full, clear, and exact description.

Generally speaking, the primary object of this invention is to enable a single lever, when rocked in one direction or the other, to selectively move either of two slides or equivalent devices without causing any movement of the other. Another object is to enable an operator by imparting like movements in the same direction, either forward or backward, to two levers, to cause each lever to selectively move either of two slides with which it is associated, and to move these two selected slides in the opposite directions.

A secondary but important object of the invention is to enable a small force applied to the lever to exert a large force on the slide which force shall be constant within narrow limits. For example, if as in the specific construction shown, the slides were used to operate clutches, the force applied to the latter would not exceed a predeterminable amount irrespective of the total force applied to the lever and irrespective within certain limits of the wear or error in location of the parts.

The invention in the specific form shown is designed for use in connection with the power transmitting mechanism which forms the subject matter of our co-pending application Serial No. 342,625 filed December 5, 1919.

That mechanism includes two parallel longitudinal driven shafts, the function of said shafts being to drive forward or backward at different speeds the two driving wheels of a vehicle, especially a track laying tractor. Said mechanism also includes four gear sleeves, two of which are rotatably mounted on each of said driven shafts, and clutches by which the gear sleeves are selectively clutched to the shafts on which they are mounted. In the construction referred to the gears carried by these gear sleeves differ in size, and are so intermeshed that when any gear sleeve is rotated all of the others must be rotated but in the following peculiar relation, to wit:—

The two gear sleeves on one shaft rotate in the same direction while both gear sleeves on the second shaft rotate in the opposite direction to those on the first shaft; but the front gear sleeve on one shaft turns at the same rate as the rear gear sleeve on the second shaft and the rear gear sleeve on the first shaft turns at the same rate as the front sleeve on the second shaft.

Associated with these several sleeves are clutches for connecting them with the shafts on which they are respectively mounted. Associated with each clutch is a sleeve slidably mounted upon the shaft for operating the clutch.

Obviously both gear sleeves on a shaft must not at the same time be clutched to said shaft. Obviously, it is desirable that means be provided for clutching any gear sleeve to the shaft on which it is mounted. Obviously, it is desirable that the mechanism for selectively operating the clutches be simple and easy to operate to produce any desired specific connection. It is also obvious that when the operator desires to produce like results as to rates of revolution in the two shafts by the manipulation of two levers he will be less likely to make a mistake if he can do that by moving both levers in the same direction.

The present invention attains all of these obviously desirable results in connection with the particular transmission mechanism referred to. The invention probably is most useful when used with the particular transmission mechanism shown or some equivalent thereof; but it is useful in many other environments, as the means for operating selectively slides of various kinds for analogous purposes.

The invention consists in the construction and combination of parts by which these results are attained, substantially as shown in the drawing and hereinafter described, and as definitely pointed out in the appended claims.

In the drawing, Fig. 1 is a plan view of the invention, and Fig. 2 is a sectional side elevation thereof.

Referring to the parts by reference characters, 20, 21, represent respectively two parallel shafts which when the transmission mechanism is used on a vehicle are intended to extend longitudinally. Two gear sleeves 30, 34, are loosely mounted on shaft 20, two other gear sleeves 40, 44, are loosely mounted on shaft 21. Gears 33, 43, of like size on the gear sleeves 30, 40, intermesh and therefore these two gear sleeves must rotate in opposite directions but at the same rate. A gear 31 on sleeve 30 meshes with a smaller gear on gear sleeve 44, and therefore the latter must rotate at a faster rate than but in the same direction as the other gear sleeve 40 on the same shaft 21. A gear 41 on the gear sleeve 40 meshes with a smaller gear on gear sleeve 34, and therefore the latter must rotate in the same direction as the gear sleeve 30 on the same shaft 20 but at a faster rate. There are four clutches associated with these four gear sleeves of which a clutch 35 is associated with the gear sleeve 30, clutch 36 is associated with gear sleeve 34, clutch 45 associated with gear sleeve 40, and clutch 46 associated with gear sleeve 44. The specific form of these several clutches is not material. Associated with each is a sliding sleeve mounted on the associated shaft, the function of said sleeve being to operate the mechanisms by which the clutches are severally opened and closed. The clutch sleeve 35ª is associated with the clutch 35, the clutch sleeve 45ª is associated with the clutch 45, the sliding sleeve 36ª is associated with clutch 36, and the sliding sleeve 46ª is associated with the clutch 46.

A lever 75 which is pivoted to a fixture engages in any suitable way with the sliding sleeve 35 for operating it, a similar lever 76 engages the clutch sleeve 36ª for operating it. A similar lever 75ª engages the sliding clutch sleeve 46ª and another similar lever engages the clutch sleeve 45ª.

The mechanism which has been described constitutes the essential parts of the transmission mechanism to which the present invention is applied for the purpose of selectively operating the several levers 75, 76, 75ª, 76ª, for the purpose of operating the associated clutch operating sleeves to the end that the clutches shall be opened or closed as desired.

Associated with the shaft 20 and the parts thereon is an operating lever 60 conveniently placed for the operator. It is fixed to a transversely extended rock shaft 62 to which in turn a two-armed rocker 63 is secured, the ends of said rocker being normally below its axis substantially as shown.

The front end of the rocker 63 has a peculiar operative connection with the front end of a link 70, the rear end of which link is pivotally connected to the upper end of the clutch operating lever 75. The rear end of the rocker 63 is similarly connected with a link 71, the rear end of which is pivoted to the upper end of the clutch operating lever 76.

The end of link 70 with which the rocker 63 is connected is provided with a curved extension 73 in which is an arc-shaped slot 72, the center of curvature being the center of the shaft 62. A pin 64 secured to the rocker 63 projects into this slot, and, when the parts are in the intermediate normal position shown, engages an end of said slot. The associated link 71 is provided with a downward extension 73 on which is a similar slot 72, and a pin 65 secured to the rocker 63 projects into this slot and normally engages the end thereof. The described parts occupy the position stated when the lever 60 is in its midway postion, at which time both the clutches 35, 36, are open. In order to remove the clutch operating sleeve 35ª in the rearward direction to close clutch 35, the operator pulls backward on the lever 60. This results in the upward movement of the front end of the rocker 63, and also of the link because of the engagement of pin 64 with the end of slot 72. This straightens the toggle composed of this end of the rocker and the corresponding link 70. The straightening of this toggle rocks the lever 75 and moves the clutch sleeve 35ª rearward, with the result of closing clutch 35 and thereby connecting gear sleeve 30 with shaft 20. While the rocker 63 is being moved as stated and with the stated results, the clutch opeating sleeve 36ª associated with clutch 35 is not moved at all, because the pin 65 on the rear end of the rocker 63 slides idly in the curved slot 73 in the associated link 71.

If, however, the operating lever 60 be moved forward, thereby producing an upward movement of the rear end of the rocker 63, the clutch sleeve 36ª will be moved forward thereby closing clutch 36. While this is being done the clutch operating sleeve 35ª on the same shaft will not be moved at all because the pin 64 will slide idly in the curved slot 72 on link 70.

There is a second lever 61 and associated with it mechanism similar to that which has been described for selectively operating the two clutch sleeves 45ª, 46ª, associated with the shaft 21. These two levers 60, 61, are similarly placed, and in such positions that a driver of the vehicle on which this mechanism is mounted may take hold of one of them with one hand and the other with the other hand. The lever 61 is fixed to a rock shaft 62ª to which is attached a rocker 63ª. This rocker 63ª is like the rocker 63 except that its ends incline upward from the shaft 62. A link 70ª connects the front end of the rocker 63ª with the lever 75ª; and link 71ª connects the rear end of the rocker 63ª with the clutch operating lever 76ª. The link 70ª has at its end an upwardly inclined extension 73ª in which is an arc-shaped slot 72ª which receives a pin 64ª secured to the front end of the rocker 63ª. A similar extension 73ª having a similarly curved slot 72ª is carried by the front end of the link 71ª and it receives a pin 65ª secured to the rear end of the rocker 63ª. When the lever 61 is moved rearward it straightens the rear toggle and thereby the rear clutch 45 will be closed but the front clutch and its associated mechanism will not be moved at all. By pushing the lever 61 forward the front clutch 46 will be closed.

From the foregoing it is apparent that when both levers 60 and 61 are pulled rearward they will close the two clutches 35 and 45, thereby connecting to the shafts 20, 21, the two corresponding gear sleeves 30, 40, whereby the two shafts 20, 21, will be rotated at the same speed, although in opposite directions. By moving both levers 60, 61, forward the two gear sleeves 34 and 44 will be clutched to their respective shafts, whereby said shafts will be rotated at the same speed, although in opposite directions.

Each of the toggle links 70, 71, 70ª, 71ª, is formed of two telescoping parts $d$ and $e$, and a spring $f$ acting to elongate the link. A pin $g$ carried by the part $d$ goes through a slot $h$ carried by the part $e$, and therefore limits the elongation of the link. When, therefore, any one of the four toggles referred to is straightened the associated link will automatically contract in length when the associated clutch has been closed, if there is any necessity therefor to prevent breakage.

The spring $f$ is put under initial tension such that it will not be substantially contracted when a certain predetermined maximum force is imparted through it to the slide operating mechanism. If, however, the force applied by the action of the described toggle through said spring exceeds this maximum the spring will contract as stated with the result that only a force slightly greater than the predetermined maximum force will be applied to the associated slide.

It will be seen that the particular form of construction illustrated in the drawings and above described is subject to variation without departing from our invention, the scope of which is indicated by the appended claims.

Having described our invention, we claim:—

1. In variable speed transmission mechanism, the combination of a driven shaft, two gear sleeves which are rotatably mounted thereon, means for turning said sleeves in the same direction but at different rates, two clutches which are respectively associated with said gear sleeves for connecting them to the shaft, a single lever, and means operated by movements of the lever in opposite directions for selectively closing either clutch without affecting the other.

2. The combination of a two arm rocker, links which are respectively connected with opposite ends of said rocker,—each connection comprising an extension on the link having a slot, pins fixed to the rocker near opposite ends thereof and projecting respectively into said slots, and movable devices to which the other ends of said links are connected.

3. The combination of a two arm rocker, links which are respectively connected with opposite ends of said rocker,—each connection comprising an extension on the link having a slot, pins fixed to the rocker near opposite ends thereof and projecting respectively into said slots, and movable devices to which the other ends of said links are connected, each link comprising two relatively movable parts, a spring for moving said parts to elongate the links, and a stop to limit such elongation.

4. The combination of a two arm rocker, links which are respectively connected with opposite ends of said rocker,—each connection comprising an extension on the link having a slot, pins fixed to the rocker near opposite ends thereof and projecting respectively into said slots, a shaft, two gear sleeves loosely mounted thereon, two clutches for respectively connecting said gear sleeves with said shaft, and clutch operating devices to which the ends of said links are connected.

5. In variable speed transmission mechanism, the combination of two parallel driven shafts, two pairs of intermeshing gear sleeves which are loosely mounted on the two shafts, clutches which are respectively associated with the four gear sleeves for connecting them with the shafts on which they are mounted, two clutch operating levers, and intermediate mechanisms through which the forward movement of both levers will close the rear clutch on one shaft and the front clutch on the other shaft, and the rearward movement of both levers will close the other two clutches.

6. The combination of two shafts, a pair of gear sleeves which are rotatably mounted on each shaft, four clutches which are respectively associated, in pairs, with the gear sleeves, two rockers mounted on aligned axes,—one having its ends extended above its pivot and one having its ends extended below its pivot, a pair of links associated with each rocker, each link associated with a rocker whose ends are below its pivots having a downward extension in which is a slot, and the other two links having upward extensions in which are slots, pins secured to the said rockers near their ends projecting into the slots of the associated links, two clutch operating mechanisms associated respectively with the two clutches on one shaft, connections between these two clutch operating mechanisms and the links associated with one rocker, two other clutch operating mechanisms respectively associated with the two clutches on the other shaft, connections between the last named two clutch operating mechanisms and the links associated with the other rocker, and two operating levers which are respectively connected with the said two rockers and extend therefrom to corresponding positions.

In testimony whereof, we hereunto affix our signatures.

GORDON R. PENNINGTON.
SAMUEL K. WELLMAN.